United States Patent
Angus et al.

(10) Patent No.: US 9,779,588 B2
(45) Date of Patent: Oct. 3, 2017

(54) MEDIA REPLENISHMENT MANAGEMENT

(71) Applicant: NCR Organization, Duluth, GA (US)

(72) Inventors: Robin Angus, Fife (GB); Michael James Neilan, Dundee (GB); Edgar Rojas, Weston, FL (US); Timothy Brown, Huntersvill, SC (US)

(73) Assignee: NCR Corporation, Duluth, GA (US)

( * ) Notice: Subject to any disclaimer, the term of this patent is extended or adjusted under 35 U.S.C. 154(b) by 491 days.

(21) Appl. No.: 14/134,201

(22) Filed: Dec. 19, 2013

(65) Prior Publication Data
US 2015/0178670 A1 Jun. 25, 2015

(51) Int. Cl.
| | |
|---|---|
| *G06Q 10/00* | (2012.01) |
| *H04B 7/00* | (2006.01) |
| *G07F 19/00* | (2006.01) |
| *G06Q 10/08* | (2012.01) |
| *G06Q 20/18* | (2012.01) |
| *G06Q 20/10* | (2012.01) |

(52) U.S. Cl.
CPC ......... *G07F 19/204* (2013.01); *G06Q 10/087* (2013.01); *G06Q 20/1085* (2013.01); *G06Q 20/18* (2013.01)

(58) Field of Classification Search
USPC .......................................................... 705/28
See application file for complete search history.

(56) References Cited

U.S. PATENT DOCUMENTS

| | | | | |
|---|---|---|---|---|
| 5,799,288 A * | 8/1998 | Tanaka | ................. | G06Q 20/108 705/42 |
| 5,984,178 A * | 11/1999 | Gill | .................... | G06Q 20/1085 235/376 |
| 6,378,770 B1 * | 4/2002 | Clark | ................. | G07D 11/0057 235/379 |
| 6,609,090 B1 * | 8/2003 | Hickman | .......... | G06F 17/30241 701/532 |
| 6,832,199 B1 * | 12/2004 | Kucek | .................. | A61B 5/0002 600/300 |
| 7,340,415 B1 * | 3/2008 | Gasper | ............... | G06Q 20/1085 705/43 |
| 7,455,219 B2 * | 11/2008 | Langlotz | ............ | G07D 11/0006 235/379 |
| 7,545,816 B1 * | 6/2009 | Coutts | ................ | G06Q 20/1085 235/375 |
| 7,752,306 B2 * | 7/2010 | Komlenic | ............... | H04L 41/04 709/224 |

(Continued)

FOREIGN PATENT DOCUMENTS

| | | | | |
|---|---|---|---|---|
| JP | 11073542 A | * | 3/1999 | |
| JP | 2005122593 A | * | 5/2005 | |

*Primary Examiner* — Ashford S Hayles
(74) *Attorney, Agent, or Firm* — Schwegman, Lundberg & Woessner

(57) ABSTRACT

A method of method of managing media replenishment at a media terminal, the method comprising: receiving a media event from a media terminal; retrieving a next scheduled media replenishment event for that media terminal; evaluating if the next scheduled media replenishment event is scheduled to occur within an acceptable delay period; and initiating an unscheduled replenishment event only if the next scheduled media replenishment event is scheduled to occur after the acceptable delay period.

16 Claims, 4 Drawing Sheets

(56) References Cited

U.S. PATENT DOCUMENTS

| | | | |
|---|---|---|---|
| 7,818,317 B1* | 10/2010 | Emigh | H04W 4/02 455/456.1 |
| 7,946,474 B1* | 5/2011 | Agrawal | G06Q 10/04 235/376 |
| 8,005,728 B2* | 8/2011 | Sadler | G06Q 10/00 705/26.1 |
| 8,161,330 B1* | 4/2012 | Vannatter | G07F 9/026 235/380 |
| 8,214,290 B1* | 7/2012 | Vannatter | G06Q 10/00 370/254 |
| 8,234,186 B2* | 7/2012 | Alba | G06Q 10/087 705/1.1 |
| 8,495,244 B2* | 7/2013 | Bonar | H04B 7/0689 709/239 |
| 8,577,802 B1* | 11/2013 | Nichols | G06Q 10/08 705/35 |
| 8,657,187 B1* | 2/2014 | Li | G06Q 10/04 235/375 |
| 9,342,963 B1* | 5/2016 | McGraw, IV | G07F 19/00 |
| 2002/0082994 A1* | 6/2002 | Herziger | G06Q 10/06 705/43 |
| 2002/0120572 A1* | 8/2002 | Bellucci | G06Q 20/06 705/43 |
| 2002/0161617 A1* | 10/2002 | Washburn | G06Q 10/20 705/305 |
| 2003/0033250 A1* | 2/2003 | Mayes | G06Q 20/1085 705/43 |
| 2004/0030622 A1* | 2/2004 | Ramos | G06Q 10/08 705/35 |
| 2004/0078802 A1* | 4/2004 | Hammer | G06F 8/316 719/318 |
| 2004/0158539 A1* | 8/2004 | Akita | G06Q 10/06 705/400 |
| 2004/0215566 A1* | 10/2004 | Meurer | G06Q 10/10 705/43 |
| 2004/0217162 A1* | 11/2004 | Chigira | G06Q 10/08 235/379 |
| 2005/0049942 A1* | 3/2005 | Richard | G06Q 10/087 705/28 |
| 2006/0131381 A1* | 6/2006 | Timmis | G05B 23/0229 235/376 |
| 2006/0163797 A1* | 7/2006 | Schmidt | G07F 9/06 271/145 |
| 2007/0034684 A1* | 2/2007 | Umeya | G06Q 20/04 235/380 |
| 2007/0282618 A1* | 12/2007 | Barahona | G06Q 10/04 705/338 |
| 2009/0164250 A1* | 6/2009 | Hamilton | G06Q 10/06393 705/3 |
| 2009/0234703 A1* | 9/2009 | Rasheed | G06Q 10/06 705/7.13 |
| 2009/0299800 A1* | 12/2009 | Neilan | G06Q 10/06 705/7.26 |
| 2009/0319572 A1* | 12/2009 | Bernard | G06Q 10/06 |
| 2010/0082443 A1* | 4/2010 | Folk | G06Q 20/10 705/16 |
| 2010/0257015 A1* | 10/2010 | Molander | G06Q 10/06 705/7.21 |
| 2010/0280878 A1* | 11/2010 | Wilson | G06Q 20/20 705/16 |
| 2011/0125615 A1* | 5/2011 | Shirbabadi | G06Q 10/00 705/28 |
| 2011/0191243 A1* | 8/2011 | Allen | G06Q 10/06315 705/43 |
| 2011/0208644 A1* | 8/2011 | Doi | G06Q 10/08 705/39 |
| 2011/0213634 A1* | 9/2011 | Karakey | G06Q 10/06 705/7.14 |
| 2011/0244892 A1* | 10/2011 | MacManus | H04W 4/02 455/457 |
| 2011/0246215 A1* | 10/2011 | Postma | G06F 19/322 705/2 |
| 2011/0295741 A1* | 12/2011 | Sugitani | G07D 11/0084 705/39 |
| 2011/0300894 A1* | 12/2011 | Roberts, Sr. | H04W 4/00 455/521 |
| 2012/0030603 A1* | 2/2012 | Bauer | G06F 9/4443 715/772 |
| 2012/0141136 A1* | 6/2012 | Blume | G07F 19/20 398/140 |
| 2012/0145777 A1* | 6/2012 | Brindley | G06Q 10/06 235/375 |
| 2012/0259745 A1* | 10/2012 | Kusada | A01K 5/02 705/28 |
| 2013/0006718 A1* | 1/2013 | Nielsen | G06Q 10/06312 705/7.42 |
| 2013/0317875 A1* | 11/2013 | Parker | G06Q 10/06313 705/7.23 |
| 2014/0052484 A1* | 2/2014 | Bellamy | G06Q 10/06315 705/7.13 |
| 2014/0074530 A1* | 3/2014 | Bellamy | G06Q 10/04 705/7.16 |
| 2014/0084052 A1* | 3/2014 | Wayne | G06Q 10/06 235/375 |

* cited by examiner

MEDIA REPLENISHMENT MANAGEMENT

FIELD OF INVENTION

The present invention relates to managing media replenishment. In particular, although not exclusively, the invention relates to managing replenishment of media in the form of banknotes at a media terminal, such as an automated teller machine (ATM).

BACKGROUND OF INVENTION

ATMs need periodic replenishment so that they can continue to dispense cash to customers. Owners of large ATM networks typically use cash forecasting techniques to ensure that sufficient cash is present throughout a bank's network (which includes the bank's ATMs) to maintain availability of cash and to minimize cash replenishment operations, without requiring large amounts of surplus cash (which is expensive) to be located within the network.

A cash forecasting system generates recommended scheduled visits and recommended replenishment amounts based on business rules provided to the cash forecasting system. Which rules are supported and how they are implemented is one of the key differentiators between cash forecasting solutions.

A cash forecasting system is typically aware of the forecasted cash demand, current scheduled replenishment visits, and current scheduled replenishment amounts.

However, when an ATM experiences a significantly higher demand for cash due to unusual local conditions (for example, surrounding ATMs being out of service or an unforecasted local event that drives a need for cash), an ATM management system detects one or more of: cash count thresholds being reached, cash low events, or cash out events. This drives an emergency cash dispatch to replenish the ATM. This dispatch is expensive, and may not be necessary if a cash replenishment operation is scheduled within a few hours of the emergency cash dispatch.

SUMMARY OF INVENTION

Accordingly, the invention generally provides methods, systems, and software for improving media replenishment by taking account of scheduled replenishment operations prior to activating an emergency (or unscheduled) replenishment operation.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of managing media replenishment of a media terminal, the method comprising: receiving a media event from a media terminal; retrieving a next scheduled media replenishment event for that media terminal; evaluating if the next scheduled media replenishment event is scheduled to occur within an acceptable delay period; and initiating an unscheduled replenishment event only if the next scheduled media replenishment event is scheduled to occur after the acceptable delay period.

The step of receiving a media event from a media terminal may comprise receiving a real time media event from a media terminal.

The step of receiving a media event from a media terminal may comprise receiving the media event directly from the media terminal. Alternatively, the step of receiving a media event from a media terminal may comprise receiving the media event from a management application operable to manage a media terminal network in which the media terminal is located.

The method may comprise the further step of: displaying the received media event on a graphical user interface (GUI) to indicate to a user of the GUI the type of media event and the time associated with that event.

The GUI may provide a visual representation of a media terminal network (including a plurality of media terminals within that network), the event type and time at the visual representation of that media terminal.

The graphical user interface may allow a user of the GUI to select a media terminal and may present media events to the user, including media low events, scheduled media replenishment events, and the like.

The graphical user interface may provide a color-coded notification of the status of the media terminal. The status may comprise the operational status (for example, in service, out of service), the cash replenishment status (for example, high cash level, medium cash level, low cash level).

The step of retrieving a next scheduled media replenishment event for that media terminal may occur before or after receiving the media event. The GUI may indicate, for each media terminal, the next scheduled media replenishment event (including, for example, the time the replenishment operation is scheduled to occur and the amount of media that will be added to the media terminal).

The acceptable delay period may be predefined. For example, it may be set to a defined number of hours (for example four hours). The predefined acceptable delay period may vary based on the time of day, the day of the week, the month of the year, and the like.

Alternatively, the acceptable delay period may be derived dynamically. For example, dynamic calculation may be based on the media availability within a media network including the media terminal, the amount of media available for dispatch, and the like. Dynamic calculation may involve machine-learning algorithms, such as artificial neural networks, or the like.

The step of initiating an unscheduled replenishment event only if the next scheduled media replenishment event is scheduled to occur after the acceptable delay period may comprise sending an electronic communication to a media replenishment center indicating an amount of media to be provided to the media terminal and a time at which the media replenishment is to occur.

The time at which the media replenishment is to occur may be a time of day (for example, three p.m.) or a time window (within six hours of receiving the electronic communication).

Initiating an unscheduled replenishment event may include calculating an amount of media to be provided as part of the unscheduled media event. This calculation may be based on historical information, information relating to media usage at media terminals located near to the media terminal being replenished, or the like.

The method may comprise the further step of adjusting the next scheduled media replenishment event in response to initiating an unscheduled replenishment event. This may involve reducing the amount of media required in the next scheduled media replenishment event. For example, this may involve deducting the amount being replenished in the unscheduled replenishment event (or approximately that amount) from the amount to be replenished in the next scheduled media replenishment event. The method may comprise the further steps of: receiving media total updates relating to a media terminal; calculating a time at which a media total at the media terminal is expected to fall below an acceptable threshold; ascertaining if the next scheduled replenishment event will occur before that calculated time; and changing a time of the next scheduled replenishment event so that it occurs before that calculated time. This has the advantage that a scheduled replenishment operation may be adjusted so that no unscheduled replenishment is required. In particular, unscheduled replenishment dispatches can be avoided by detecting a higher velocity of cash usage in time for the forecasting solution to recommend re-scheduling a non-emergency dispatch.

The media event may comprise a media low event, a media threshold event (that is, an event triggered when a media threshold is reached), or the like. As used herein, a "media event" refers to an event that indicates that a media terminal (or part of a media terminal, such as one of four currency cassettes, a cash drawer, or the like) will require replenishment with media.

The media terminal may comprise a self-service terminal, an assisted service terminal, a teller station, a cash vault, or the like. The self-service terminal may comprise an automated teller machine.

The media may comprise cash (such as banknotes or coins). Alternatively, the media may comprise stamps, coupons, tickets, or the like.

The method may comprise the further step of scheduling replenishment events at a plurality of media terminals within a media terminal network by implementing a media optimization algorithm to indicate how much media should be located at each media terminal.

According to a second aspect there is provided a media terminal manager comprising: (i) an event manager operable to receive events from media terminals being managed by the media terminal manager; (ii) a replenishment manager operable to provide a user of the media terminal manager with information about scheduled media replenishment operations for the media terminals being managed by the media terminal manager; and (iii) a replenishment dispatcher operable to issue media replenishment requests to a media replenishment center to implement (a) the scheduled media replenishment operations, and (b) qualified unscheduled media replenishment operations.

The event manager may implement a network management application, such as APTRA Vision (trade mark), available from NCR Corporation, the assignee of this application.

The replenishment manager may implement a cash optimization algorithm to create replenishment schedules for each media terminal. Alternatively, the replenishment manager may include an interface through which the replenishment manager receives information about scheduled media replenishment operations for the media terminals being managed by the media terminal manager.

The replenishment dispatcher may be configured to issue qualified unscheduled media replenishment operations if a media event is received for a media terminal indicating that media replenishment is required, and no scheduled media replenishment operation is due within an acceptable delay period.

The media terminal manager may further comprise a graphical user interface (GUI) including a visual representation of media terminals being managed by the media terminal manager. A visual representation of events may be provided at each media terminal. The visual representation of events may be selectable to provide details of that event. The GUI may also indicate at each depiction of a media terminal the next scheduled replenishment operation for that media terminal. Each of the event manager, the replenishment manager, and the replenishment dispatcher may be operable to update the GUI.

The media terminal manager may provide a manual override facility to allow a user of the media terminal to initiate a qualified unscheduled media replenishment operation even if a scheduled media replenishment operation is due within the acceptable delay period.

The media replenishment requests may indicate an amount of media to be provided to a media terminal and a time at which the media replenishment is to occur.

According to a third aspect there is provided a media terminal network comprising a media terminal manager according to the second aspect and a plurality of media terminals.

According to a fourth aspect there is provided a method of managing media replenishment at a media terminal, the method comprising: receiving a media event from a media terminal; retrieving a next scheduled media replenishment event for that media terminal; and only initiating an unscheduled replenishment event in response to a determination that the next scheduled media replenishment event is scheduled to occur after an acceptable delay period.

According to a fifth aspect there is provided a method of managing media replenishment at a media terminal, the method comprising: receiving media total updates relating to a media terminal; calculating a time at which a media total at the media terminal is expected to fall below an acceptable threshold; ascertaining if a next scheduled replenishment event for that media terminal will occur before that calculated time; and changing a time of the next scheduled replenishment event so that it occurs before that calculated time.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
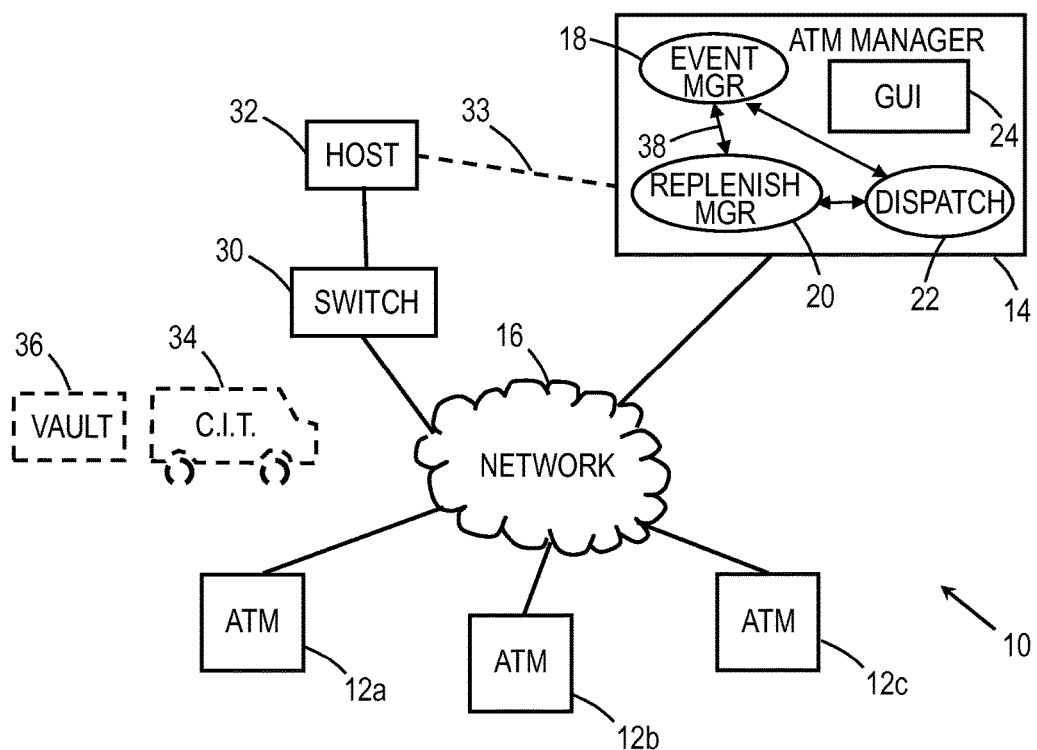
FIG. 1 is a simplified block diagram illustrating a system for managing media replenishment according to one embodiment of the present invention.

Reference is first made to FIG. 1, which is a block diagram illustrating a system (or network) 10 for managing media replenishment (in particular cash replenishment) according to one embodiment of the present invention.

The system 10 comprises a plurality of media terminals 12 (only three of which are illustrated in FIG. 1) in the form of automated teller machines (ATMs) coupled to a remote media terminal manager (in this embodiment, an ATM manager) 14 by an Internet Protocol (IP) network 16.

The ATM manager 14 comprises four main components: (i) an event manager application 18 operable to receive events from the plurality of ATMs 12; (ii) a replenishment manager application 20 operable to schedule cash replenishment operations for the ATMs 12; (iii) a replenishment dispatcher application 22; and a graphical user interface (GUI) 24.

In this embodiment, the three applications are located on the same server (the ATM manager 14); however, in other embodiments, the three applications may be located on two or three different servers and may be coupled by one or more networks.

The event manager application 18 is similar to the NCR APTRA Vision application, available from NCR Corporation. The event manager application 18 is used to monitor the status and performance of the ATMs 12 in the system 10, and to manage incidents at the ATMs 12 by dispatching customer engineers respond to those incidents.

Each of the ATMs 12 may be configured with a management agent, such as the Unified Agent (trade mark), available from NCR Corporation, to interface with the event manager application 18.

The replenishment manager application 20 implements cash optimization algorithms and functions. In this embodiment the replenishment manager application 20 is similar to the NCR APTRA OptiCash (trademark) software, available from NCR Corporation.

NCR APTRA OptiCash software provides an advanced cash management solution that predicts the demand for currency at each media terminal (or other cash point), such as the ATMs 12, on an individual basis. By applying sophisticated mathematical algorithms to historical, event and cost data, the optimum cash position and delivery schedule for each ATM 12 (or each currency cassette or cash drawer within an ATM 12) is determined.

The system 10 also comprises a conventional transaction switch 30 and an authorization server 32 (also referred to as a transaction host or an authorization host). As is known in the art, the transaction switch 30 is used to route transactions requested by a customer at one of the ATMs 12 to a financial institution that maintains an account for that customer.

The authorization server 32 also stores account information for all of the customers of the financial institution that owns or operates the system 10, and also stores information about each ATM 12 (such as the cash totals, total amount dispensed since last replenishment, and the like). In this embodiment, the transaction switch 30 and the authorization server 32 are conventional, unmodified, devices similar to those currently used in conventional ATM networks.

The event manager application 18 may receive information and events directly from the ATMs 12 and/or from the transaction switch 30 (broken line 33 in FIG. 1 illustrates this communication).

A media replenisher 34, in the form of a cash-in-transit (or CIT) person, is illustrated in a vehicle that conveys currency from the currency vault (also referred to as a CIT center, a cash vault, or a bullion center) 36 to the ATMs 12 in response to a cash replenishment request issued by the replenishment dispatcher application 22 (as will be described in more detail below).

The replenishment dispatcher application 22 is operable to issue cash replenishment requests to the CIT center 36 according to a defined schedule (scheduled cash replenishments) or in response to the ATM 12 running low or out of cash (unscheduled cash replenishments). However, in this embodiment unscheduled cash replenishments are only issued automatically if certain criteria are met (or manually if a human activates a manual override option), as will be described in more detail below.

The media replenisher 34 and the currency vault 36 are not part of the system 10 but provide replenishment services thereto. The currency vault 36 may provide cash to multiple systems 10 (for example, different ATM networks operated by different financial institutions).

Figure 2:
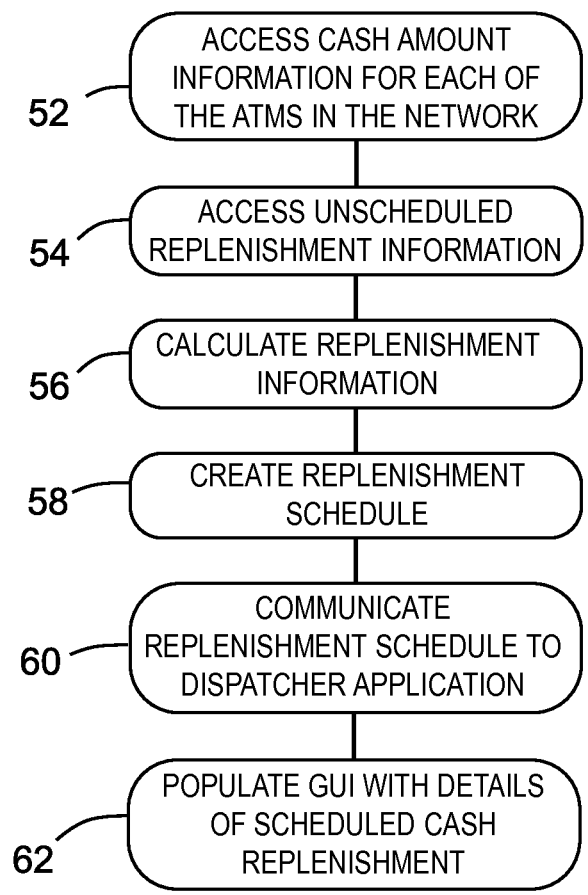
FIG. 2 is a flowchart illustrating steps performed by the media terminal manager of FIG. 1 in creating a media replenishment schedule for media terminals (ATMs) in the system of FIG. 1.
Figure 3:
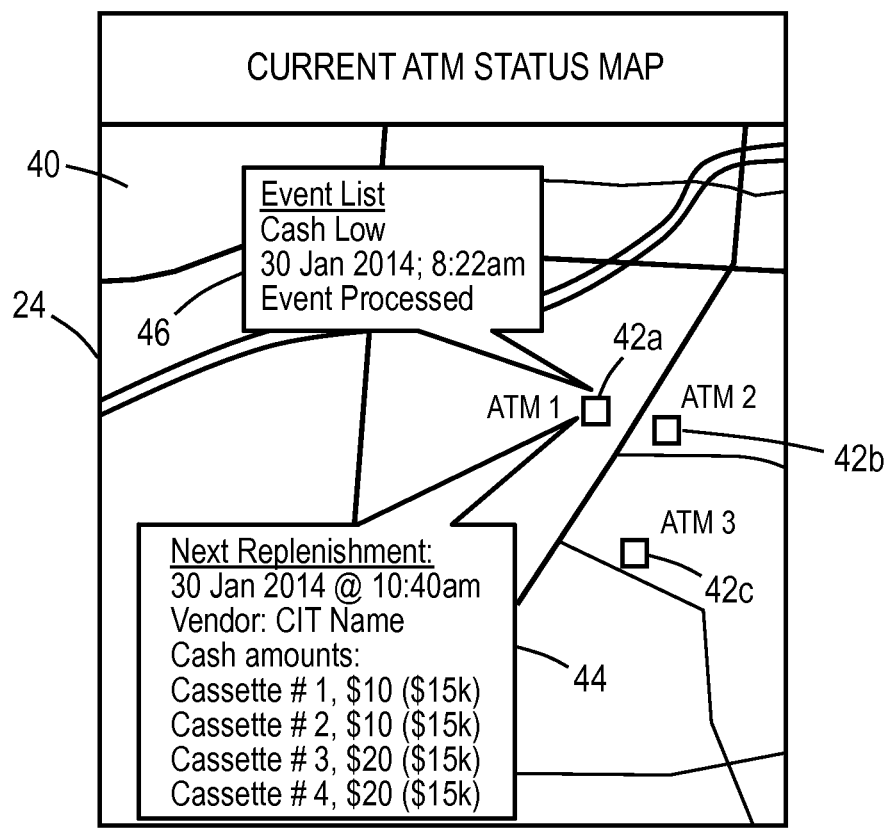
FIG. 3 is a pictorial diagram illustrating a graphical user interface provided by the media terminal manager of FIG. 1.

Reference will now also be made to FIG. 2 and FIG. 3. FIG. 2 is a flowchart 50 illustrating steps performed by the ATM manager 14 in creating a cash replenishment schedule. FIG. 3 is a pictorial diagram illustrating the graphical user interface 24. As used herein, a "cash event" is an event that indicates that one of the ATMs 12 (or part of the ATMs 12, such as one currency cassette) will need replenishment with cash. Examples of cash events are cash low events, cash empty events, and the like.

Initially, the replenishment manager application 20 accesses cash amount information for each of the ATMs 12 and any other cash terminals (such as assisted teller terminals) in the network 10 (step 52). This cash amount information may be stored by the event manager application 18 in a shared area accessible by both the event manager application 18 and the replenishment manager application 20. Alternatively, the replenishment manager application 20 may send a request for this information to the event manager application 18 across a defined interface 38.

The replenishment manager application 20 also accesses any unscheduled replenishment information relating to the ATMs 12 (this will be described in more detail with reference to FIG. 4 below) (step 54). This enables the replenishment manager application 20 to take account of any unscheduled replenishments initiated but not yet completed.

Taking all of this accessed information into account (in addition to other information, such as the time of year, currency demands in the previous replenishment cycles, and the like) the replenishment manager application 20 then calculates when each ATM 12 needs to be replenished with cash and how much cash is needed for each ATM 12 (step 56).

The replenishment manager application 20 then creates a cash replenishment schedule that includes the cash replenishment details calculated in step 56 (step 58) and communicates the cash replenishment schedule to the replenishment dispatcher application 22 (step 60).

The replenishment manager application 20 also populates the GUI 24 with details of the scheduled cash replenishment (step 62).

The GUI 24 displays a street map 40 of the vicinity of the ATMs 12 in the network 10. The GUI 24 also displays an icon 42a,b,c for each ATM 12a,b,c representing the physical location on the map of each ATM 12. Each icon 42 is colored to indicate the status of that ATM 12. When a user of the GUI 24 hovers over or clicks on different parts of the ATM icons 42 additional information (shown by text boxes 44 and 46 in FIG. 3) is displayed that is relevant to that ATM 12. This additional information includes the cash status of that ATM (high, medium, or low amount of cash remaining) details of the next scheduled replenishment (from the cash replenishment schedule) (shown in box 44) and details of events received relating to that ATM 12 (shown in box 46). If there is currently an incident at that ATM 12 (for example, the ATM is out of service) then details of the incident are also provided. It will be appreciated that numerous different graphical formats may be provided to convey information relating to the ATMs 12.

As new cash totals are received from each ATM 12, the event manager application 18 updates the GUI 24 so that the current cash totals are shown. Similarly, the event manager application 18 updates the GUI 24 if any incident is received relating to one of the ATMs 12. These activities of the event manager application 18 updating the GUI 24 occur in parallel with the flow 50 described above.

Figure 4:
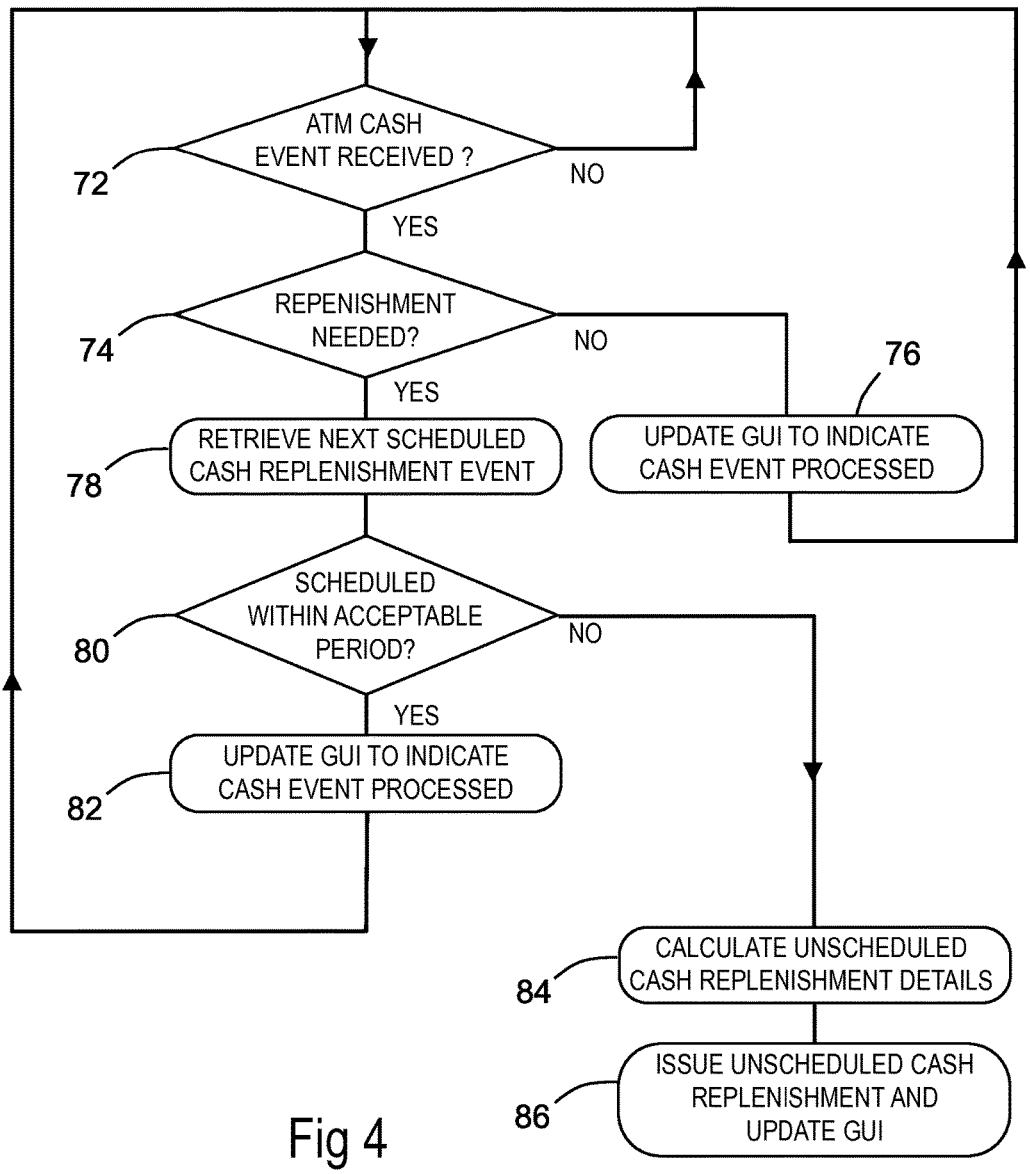
FIG. 4 is a flowchart 70 illustrating steps performed by the media terminal manager in evaluating if media replenishment is required in response to a media event received from one of the media terminals (ATMs) of FIG. 1.

Reference will now be made to FIG. 4, which is a flowchart 70 illustrating steps performed by the ATM manager 14 in evaluating if cash replenishment is required in response to a cash event received from one of the ATMs 12.

The event manager 18 is configured to receive events created by the ATMs 12 (step 72).

If a cash event (that is, an event relating to cash being low or empty in an ATM or a currency cassette within an ATM) from one of the ATMs 12 is received by the event manager application 18, which could occur at any time, then the ATM manager 14 ascertains if cash replenishment is needed to prevent the ATM 12 going out of service (step 74). An example of when cash replenishment may not be needed is if there are four currency cassettes in the ATM 12, and only one of them has reached a cash low condition and the other three cassettes are well stocked with cash, then a cash replenishment operation may not be required.

If replenishment is not needed, then the ATM manager 14 updates the GUI 24 to indicate that the cash event has been processed (so that a user of the GUI 24 does not manually trigger a cash replenishment dispatch operation) but the ATM manager 14 does not trigger an unscheduled cash replenishment (step 76).

If replenishment is needed, then the ATM manager 14 retrieves a next scheduled cash replenishment event for that ATM 12 (step 78).

The ATM manager 14 then evaluates if the next scheduled cash replenishment event is scheduled to occur within an acceptable delay period (step 80). The acceptable delay period can be configured based on multiple parameters, for example: the lead time for cash delivery, the geographic spread of the network, how long it will take to travel from the vault 36 to an ATM 12, the current demand for cash at that ATM 12 or in the network 10 as a whole, the time at which the cash event occurs, and the like. In this example, the acceptable delay period for the combination of the ATM 12 that triggered the cash event and the time at which the cash event occurred is four hours.

If the next scheduled cash replenishment event is scheduled to occur within the acceptable delay period (in this example, in less than four hours from when the cash event was received), then the ATM manager 14 updates the GUI 24 to indicate that the cash event has been processed (so that a user of the GUI 24 does not manually trigger a cash replenishment dispatch operation) but the ATM manager 14 does not trigger an unscheduled cash replenishment (step 82).

If the next scheduled cash replenishment event is not scheduled to occur within the acceptable delay period (in this example, if the next scheduled cash replenishment event is more than four hours from when the cash event was received), then the ATM manager 14 (in particular, the replenishment manager application 20) calculates the amount that should be provided to replenish the ATM 12 that triggered the cash event, and also decides if other ATMs 12 should also be replenished (which may enable a scheduled cash replenishment operation to be cancelled) (step 84).

The ATM manager 14 (in particular, the replenishment dispatcher application 22) then issues a replenishment request to the currency vault 36 for an unscheduled cash replenishment (referred to herein as a qualified unscheduled cash replenishment) and updates the GUI 24 to indicate that an unscheduled cash replenishment has been initiated (including details of the unscheduled cash replenishment) (step 86). This may involve updating the details of multiple ATMs 12 on the GUI 24 if more than one ATM 12 is to be replenished as part of the unscheduled replenishment.

The details of the unscheduled cash replenishment include when the replenishment is expected to occur, the amount of cash to be replenished (including the amount and denomination for each currency cassette), the name of the replenishment company, and the like. In this embodiment, the replenishment request is issued by sending an electronic communication to the vault 36.

The replenishment dispatcher application 22 monitors for confirmation of receipt of the dispatch instructions to ensure that the replenishment request was received by the currency vault 36.

The GUI 24 may also display the accuracy of the replenishment manager application 20 by depicting the forecasting cash demand and the actual cash usage (as indicated by the cash counts received from the ATMs 12) in any convenient manner (such as a line graph, a bar chart, traffic lights, or the like). The ATM manager 14 may provide this depiction in the format of a report that can be emailed to authorized users who may have an interest in monitoring the performance of the replenishment manager application 20.

The replenishment manager application 20 may monitor cash counts received by the event manager application 18 and may modify the scheduled cash replenishment operations to take account of actual cash demand in the network 10 rather than just relying on predicted cash demand. This may enable the network 10 to avoid using unscheduled replenishment operations by increasing the frequency of scheduled replenishment operations in response to a higher than predicted demand for cash.

The ATM manager 14 may also provide a manual override facility that allows an authorized user of the GUI 24 (having sufficient privileges to make such a request) to request replenishment of any of the ATMs 12 at any time.

It should now be appreciated that this embodiment has the advantage of requiring fewer unscheduled (emergency) cash replenishments, which are typically much more costly than scheduled cash replenishments. Where an unscheduled replenishment is required, the amount and denominations used can be optimized by the replenishment manager application 20 and integrated into the scheduled replenishment cycle.

Various modifications may be made to the above described embodiment within the scope of the invention, for example, in other embodiments, media terminals other than ATMs, or networks other than SSTs (for example, point of sale (PoS) terminal networks, assisted service terminal networks, mixed PoS, assisted service, and ATM networks, or the like), may be used to implement the media count management function.

In other embodiments, media other than, or in addition to, cash, for example, stamps or tickets, may be replenished.

In other embodiments, the ATM manager 14 may be incorporated into the transaction switch 30 or the authorization server 32.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of managing media replenishment of a media terminal, the method comprising:
   receiving a media event from a media terminal;
   retrieving a next scheduled media replenishment event for that media terminal;
   evaluating if the next scheduled media replenishment event is scheduled to occur within an acceptable delay period;
   initiating an unscheduled replenishment event only if the next scheduled media replenishment event is scheduled to occur after the acceptable delay period; and
   populating a Graphical User Interface (GUI) with a street map and an icon representing a physical location of the media terminal on the street map for the unscheduled replenishment, and presenting: 1) a cash status for the media terminal that is selected from high cash remaining at the media terminal medium cash remaining at the media terminal and low cash remaining at the media terminal 2) details for a next scheduled media replenishment, and 3) details of events received for the media terminal when the icon is hovered over, and an incident indication as to whether the media terminal is currently in service or out of service.

2. A method according to claim 1, wherein the method comprises the further steps of:
   receiving media total updates relating to a media terminal;
   calculating a time at which a media total at the media terminal is expected to fall below an acceptable threshold;
   ascertaining if the next scheduled replenishment event will occur before that calculated time; and
   changing a time of the next scheduled replenishment event so that it occurs before that calculated time.

3. A method according to claim 1, wherein the step of receiving a media event from a media terminal comprises receiving the media event directly from the media terminal.

4. A method according to claim 1, wherein the step of receiving a media event from a media terminal comprises receiving the media event from a management application operable to manage a media terminal network in which the media terminal is located.

5. A method according to claim 1, wherein the method comprises the further step of: displaying the received media event on the graphical user interface (GUI) to indicate to a user of the GUI the type of media event and the time associated with that event.

6. A method according to claim 5, wherein the GUI provides a visual representation of a media terminal network including a plurality of media terminals within that network, the event type and time at the visual representation of that media terminal.

7. A method according to claim 6, wherein the graphical user interface allows a user of the GUI to select a media terminal and presents media events to the user.

8. A method according to claim 7, wherein the graphical user interface provides a color-coded notification of the status of the media terminal.

9. A method according to claim 1, wherein the step of retrieving a next scheduled media replenishment event for that media terminal occurs before receiving the media event.

10. A method according to claim 1, wherein the acceptable delay period is predefined.

11. A method according to claim 1, wherein the acceptable delay period is derived dynamically.

12. A method according to claim 1, wherein the step of initiating an unscheduled replenishment event only if the next scheduled media replenishment event is scheduled to occur after the acceptable delay period further comprises sending an electronic communication to a media replenishment center indicating an amount of media to be provided to the media terminal and a time at which media replenishment is to occur.

13. A method according to claim 1, wherein the media event comprises one or more of: a media low event, a media threshold event and a media out event.

14. A method according to claim 1, wherein initiating an unscheduled replenishment event includes calculating an amount of media to be provided as part of the unscheduled media event.

15. A method according to claim 1, wherein the method comprises the further step of adjusting the next scheduled media replenishment in response to initiating an unscheduled replenishment event.

16. A method according to claim 15, wherein adjusting the next scheduled media replenishment event includes reducing the amount of media required in the next scheduled media replenishment event.

\* \* \* \* \*